United States Patent
Galvani et al.

(10) Patent No.: US 7,168,659 B2
(45) Date of Patent: Jan. 30, 2007

(54) CONTROL DEVICE FOR MOVING A VEHICLE CLOSURE ELEMENT

(75) Inventors: Eric Galvani, Pompertuzat (FR); Guy Valembois, Blagnac (FR); Jean Baricos, Ramonville St Agne (FR); Roland Texcier, Montrabe (FR); Joël De Reseguier, Toulouse (FR)

(73) Assignees: Etienne Lacroix Tous Artifices, Muret (FR); Latecoere, Toulouse (FR)

( * ) Notice: Subject to any disclaimer, the term of this patent is extended or adjusted under 35 U.S.C. 154(b) by 0 days.

(21) Appl. No.: 11/015,914

(22) Filed: Dec. 17, 2004

(65) Prior Publication Data

US 2005/0178601 A1 Aug. 18, 2005

(30) Foreign Application Priority Data

Dec. 19, 2003 (FR) .................................. 03 15002

(51) Int. Cl.
 *B64C 1/14* (2006.01)
(52) U.S. Cl. .................................................. 244/129.5
(58) Field of Classification Search ................ 244/121, 244/122 AF, 129.4, 129.5; 49/137; 89/1.14
See application file for complete search history.

(56) References Cited

U.S. PATENT DOCUMENTS 2,924,404 A * 2/1960 Mcanally .................... 244/121
3,940,887 A * 3/1976 Slaybaugh .................... 49/137
4,607,812 A * 8/1986 De Haan et al. .......... 244/129.5
5,156,359 A * 10/1992 Noble et al. ............. 244/129.4
5,180,121 A * 1/1993 Banks et al. ............. 244/129.5
5,289,615 A * 3/1994 Banks et al. .................. 16/366
5,303,631 A * 4/1994 Frehaut et al. ............... 89/1.14
5,379,971 A * 1/1995 Kim et al. ................ 244/129.5
5,687,452 A * 11/1997 Hamatani et al. ............... 16/82
2006/0010769 A1* 1/2006 Pelz ............................. 49/141

FOREIGN PATENT DOCUMENTS

DE 4124377 12/1992
EP 0741073 11/1996

\* cited by examiner

*Primary Examiner*—Galen Barefoot
(74) *Attorney, Agent, or Firm*—Blakely Sokoloff Taylor & Zafman

(57) ABSTRACT

The present invention provides a device for controlling the movement of a vehicle closure element, the device comprising, interposed between a vehicle structure and a closure element, firstly a driver element that can be activated on command, constituted by a pyrotechnic actuator, and secondly mechanical connection means suitable for allowing a driving connection between the pyrotechnic actuator and the closure element when the pyrotechnic actuator is activated, while also allowing the closure element to move freely relative to the pyrotechnic actuator when the closure element is moved over a stroke greater than that enabling said driving connection.

26 Claims, 5 Drawing Sheets

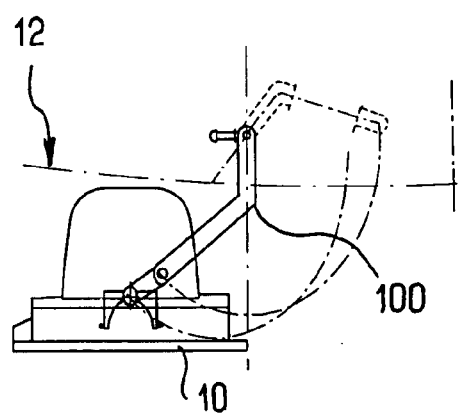
FIG_1
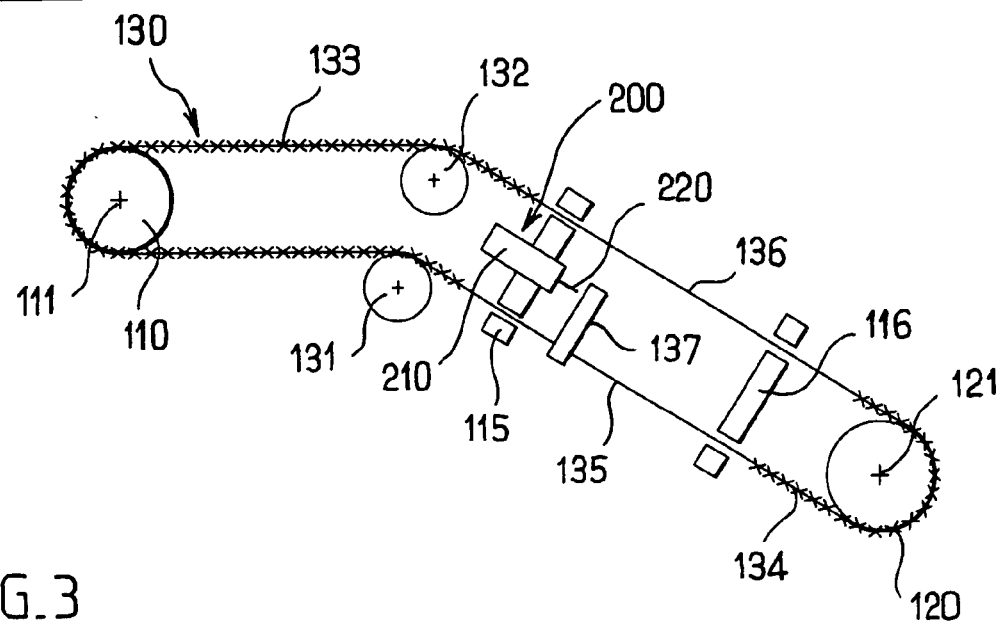
FIG_2
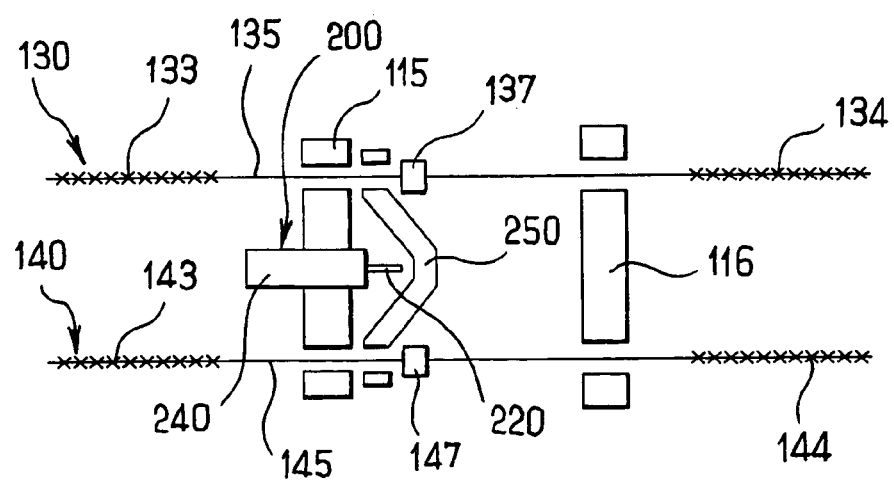
FIG_3

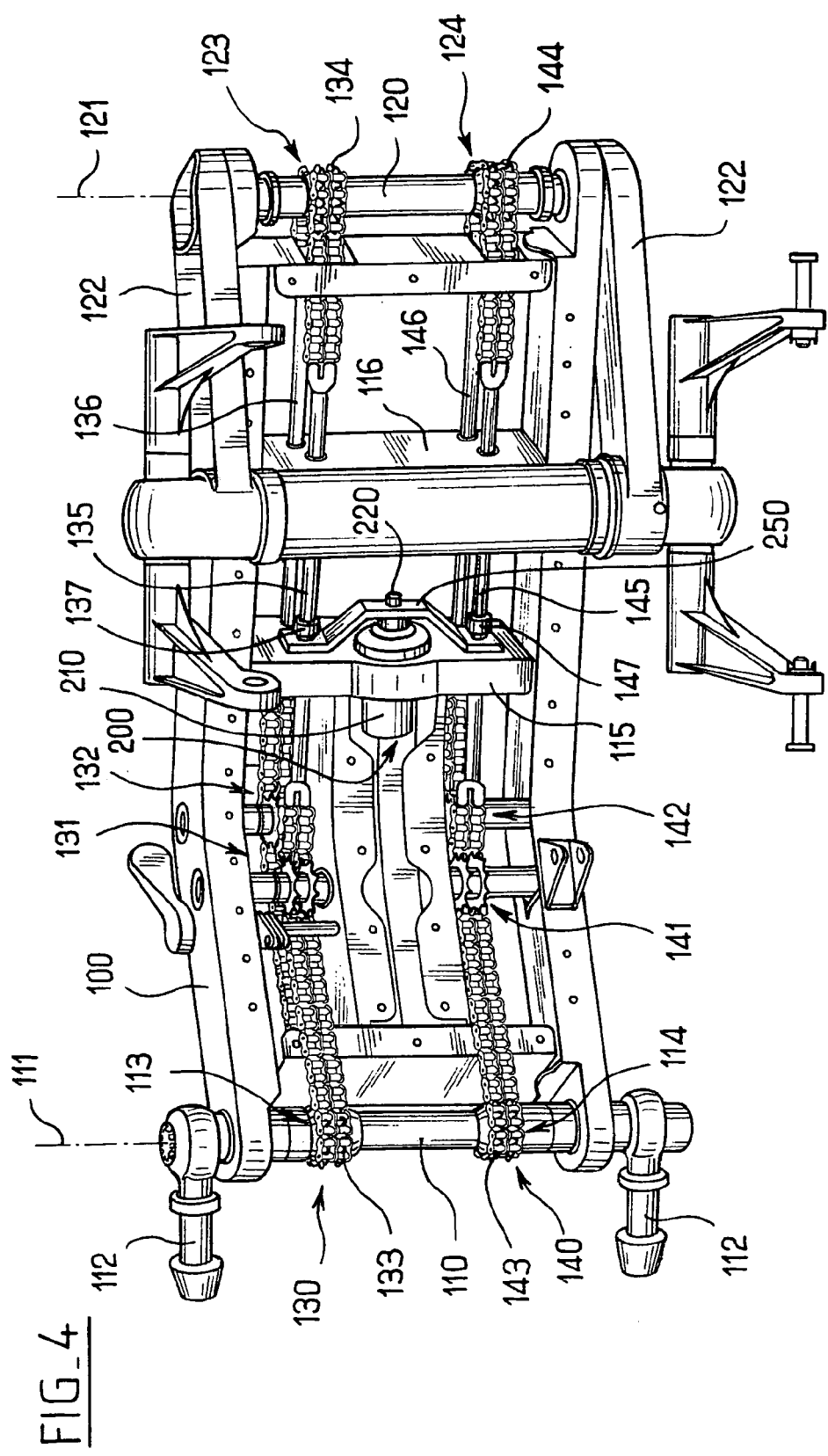
FIG_4

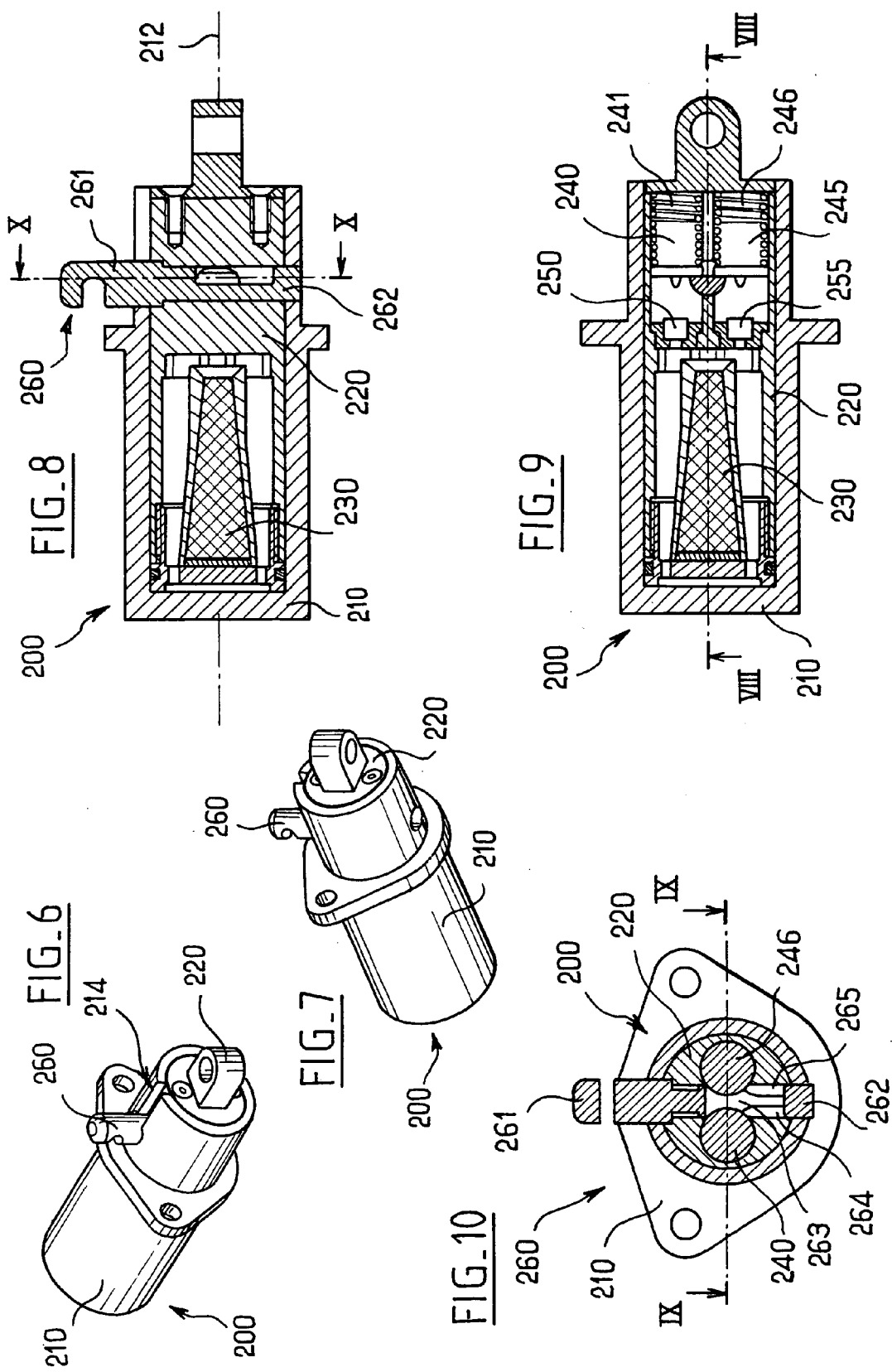

CONTROL DEVICE FOR MOVING A VEHICLE CLOSURE ELEMENT

FIELD OF THE INVENTION

The present invention relates to the field of control devices for moving closure elements of vehicles.

It applies in particular to controlling emergency opening of aircraft doors.

However the invention is not limited to that particular application.

It can be applied to any type of closure element, in particular any type of door or hatch, and to any type of vehicle, in particular for use in the air, in space, on land, or at sea.

Various control devices have already been proposed for moving closure elements, in particular for an airplane door.

OBJECTS AND SUMMARY OF THE INVENTION

An object of the present invention is to improve existing means by proposing a novel device making it possible: 1) to reduce the overall weight of the system; 2) to improve the reliability and the performance of the system; and 3) to reduce and simplify maintenance operations, and in particular to allow them to be spaced more widely apart.

The three above targets are of major importance nowadays for airlines.

This object is achieved in the context of the present invention by a device comprising, interposed between a vehicle structure and a closure element, e.g. an airplane door, firstly a driver element that can be activated on command, constituted by a pyrotechnic actuator, and secondly mechanical connection means suitable for allowing a driving connection between the pyrotechnic actuator and the closure element when the pyrotechnic actuator is activated, while also allowing the closure element to move freely relative to the pyrotechnic actuator when the closure element is moved over a stroke greater than that enabling said driving connection.

The use of a driver element based on a pyrotechnic actuator makes it possible to provide an assembly that is significantly more compact and lighter in weight than the means known in the prior art based on actuators that are electrical, pneumatic, or hydraulic. A pyrotechnic actuator is independent and, for example, it does not require the equivalent of a significant auxiliary supply of pneumatic or hydraulic driving fluid.

In addition, the above-mentioned mechanical connection means specific to the invention make it possible to avoid transmitting high levels of stress to the closure element. They also provide great flexibility in defining the mechanics and the stroke of the closure element.

Thus, in a particular and non-limiting embodiment of the invention, the pyrotechnic actuator takes the place of an active impulse thruster acting solely over a limited initial portion of the stroke of the closure element. Under such circumstances, the size of the actuator can be particularly small, since its stroke is much smaller than that of the closure element.

BRIEF DESCRIPTION OF THE DRAWINGS

Other characteristics, objects, and advantages of the present invention appear on reading the following detailed description made with reference to the accompanying drawings, given as non-limiting examples, and in which:

FIG. 1 is a diagram showing the general architecture of conventional hinge means for connecting an airplane door to a fuselage;

FIG. 2 is a diagrammatic view of airplane door drive means constituting an embodiment of the present invention;

FIG. 3 is a fragmentary side view of the same means;

FIG. 4 is a more detailed perspective view of a device constituting an embodiment of the present invention;

FIG. 6 is a first perspective view of such a driver element;

FIG. 7 is a second perspective view of the driver element;

FIG. 8 is a first longitudinal section view of the driver element, in the locked rest state, the section being on a plane referenced VIII—VIII in FIG. 9;

FIG. 9 is a second longitudinal section view of the driver element in the locked position, the section being on a plane orthogonal to that of FIG. 8, as represented by IX—IX in FIG. 10;

FIG. 10 is a cross-section view of the driver element in the locked position, the section being on a plane referenced X—X in FIG. 8.

MORE DETAILED DESCRIPTION

Figure 5:
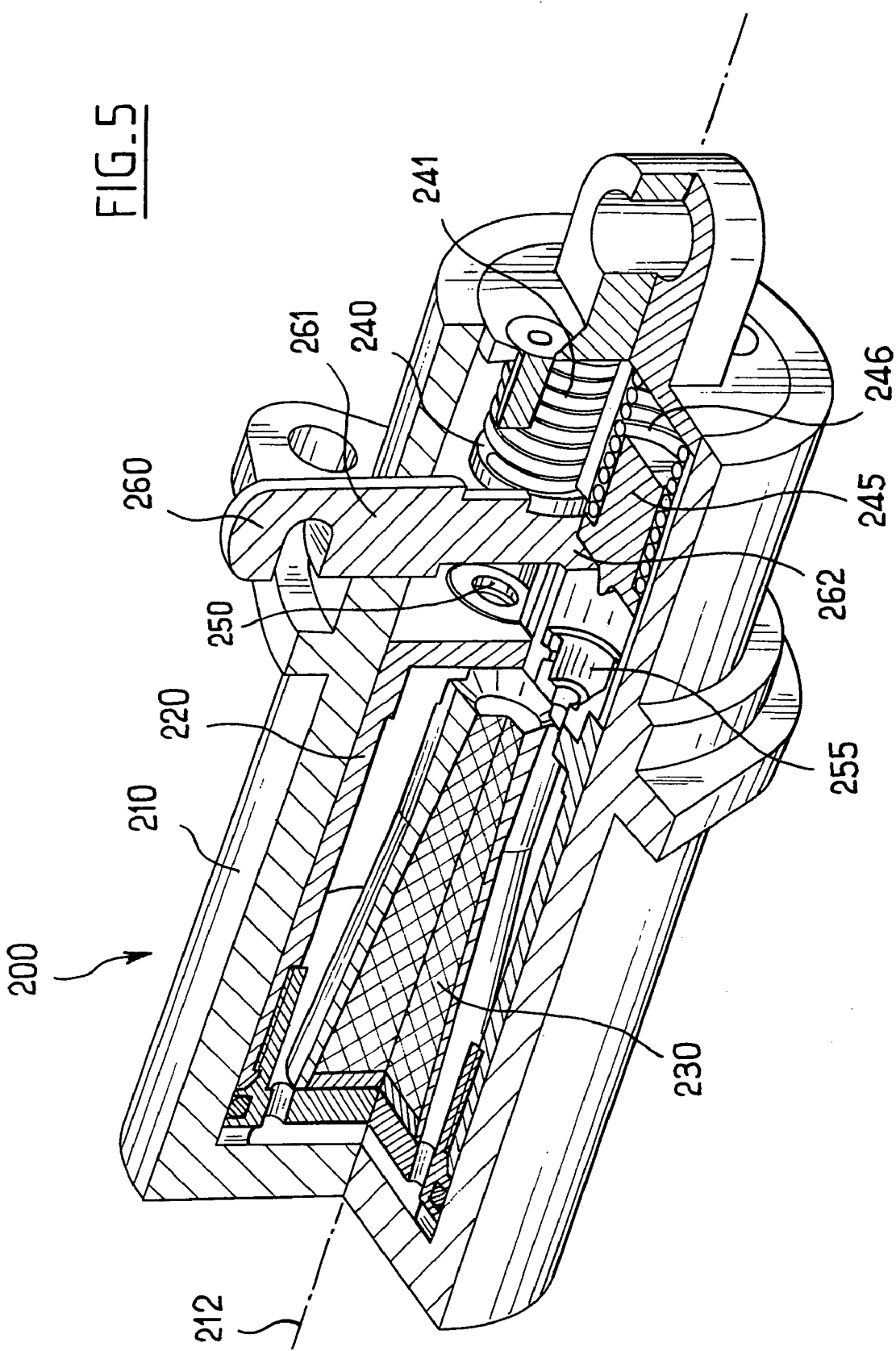
FIG. 5 is a cut-away perspective fragmentary view of a driver element of the pyrotechnic actuator type in accordance with the present invention.

Accompanying FIG. 1 shows the conventional hinge architecture for an airplane door 10, connecting the door to the fuselage of an airplane having an outside generator line referenced 12.

Essentially, the system comprises a V-shaped or L-shaped arm 100 having one end hinged to the structure or fuselage, and its other end hinged to the door 10. The precise shape and dimensions of the arm 100 depend on various parameters including the thickness of the fuselage, the location of the hinge, and the desired mechanical action. The general structure of such an arm 100 is known to the person skilled in the art and is therefore not described in detail below.

As can be seen in the accompanying figures, in the context of the invention the arm 100 preferably carries two parallel shafts 110 and 120, which shafts are advantageously substantially vertical.

The first shaft 110 is connected to the fuselage by any suitable means. These means are referenced 112 in FIG. 4. The shaft 110 is free to pivot about its longitudinal axis 111 relative to the arm 100.

The second shaft 120 is connected to the door 10 by any suitable means, for example by a set of links 122. The shaft 120 is itself free to pivot about its own longitudinal axis 121 relative to the arm 100.

The device also comprises means for providing a rotary connection between the two arms 110 and 120. In the context of the invention, these rotary connection means preferably comprise at least one chain.

Still more precisely, and preferably, the device comprises two sets of chains each in the form of a loop, constituting respectively a top loop and a bottom loop referenced 130 and 140 in FIG. 4.

Each of the two sets of chains 130, 140 meshes with two gearwheels 113, 114 and 123, 124 respectively connected to one of the two above-mentioned shafts 110 and 120. The arm 100 also carries two pairs of deflector gears 131, 132 and 141, 142 disposed to guide each set of chains 130, 140 over a circuit that follows closely the V-shape or L-shape of the arm 100.

The person skilled in the art will understand that since the arm 110 is stationary relative to the fuselage, pivoting displacement of the arm 100 relative to the fuselage leads to displacement in translation of the set of chains 130, 140 because of the co-operation defined between them and the gearwheels 113, 114, and that this leads to the shaft 120 turning relative to the arm 100 by the co-operation defined by the sets of chains 130, 140 and the gearwheels 123, 124, suitable for keeping the door 10 connected to the shaft 120 in a position that is parallel to its rest position.

Still more precisely, in a preferred embodiment shown in the accompanying figures, each set of chains 130, 140 comprises two segments of links 133, 134 and 143, 144 interconnected respectively by two parallel rods 135, 136 and 145, 146.

The two pairs of rods 135, 136, 145, 146 are guided to slide freely through vertical spaces 115, 116 carried by the arm 100.

The device of the present invention further comprises a driver element 200 constituted by a pyrotechnic actuator. The driver element 200 is carried by the arm 100. The driver element 200 essentially comprises a body 210 and a rod or piston suitable for being moved relative to the body 210. The body 210 is preferably connected to the arm 100, e.g. at the spacer 115. The rod or piston 220 carries a thruster or pusher member shaped like a crossbow and referenced 250. The thruster member 250 is placed facing abutments 137, 147 carried by respective ones of the rods 135, 145 in each of the sets of chains 130, 140.

The person skilled in the art will understand that when the door 10 is urged to move relative to the fuselage by auxiliary driver means, e.g. manually, the abutments 137, 147 are moved away from the thruster member (to the right in the illustration given in FIG. 4) such that the rods 135, 145 slide freely relative to the thruster member 250.

In contrast, when the driver element 210 is activated, the rod 220 is urged out from the body 210 and moves the thruster member 250 so as to press against the abutments 137, 147. The sets of chains 130, 140 are then caused to move in translation relative to the arm 100. This movement causes the arm 100 to pivot relative to the shaft 110, and causes the shaft 220 to pivot relative to the arm 100, thereby causing the door connected to the links 122 to open, while simultaneously keeping the door parallel relative to its initial rest position, as mentioned above.

The co-operation defined between the chains 130, 140 and the gearwheels 123, 124 constitutes an amplifier for the stroke of the actuator 200.

A preferred but non-limiting embodiment of the pyrotechnic actuator is shown in accompanying FIGS. 5 to 10.

In these figures, there can be seen the body 210 and the rod 220.

The pyrotechnic actuator 200 houses a mass 230 of pyrotechnic composition suitable for generating a hot gas which develops in a chamber between the chamber 210 and the piston 220 in order to cause the actuator to expand, i.e. to cause the rod 220 to be pushed outwards from the body 210.

By way of non-limiting example, the mass 230 of pyrotechnic composition may be a solid fuel.

In the context of the present invention, the mass 230 of pyrotechnic composition is of varying section, and more precisely of section that increases going away from its face that is initiated. The varying section of the mass 230 of pyrotechnic composition is adapted to generate an increase in the volume of gas that is developed that is proportional to the resulting increase in the size of the chamber defined between the body 210 and the piston 220 so as to exert a constant force on the rod 220 regardless of the extent to which it has been extended.

The pyrotechnic mass 230 may be initiated by any suitable means. It may be initiated by an electrical initiator.

Nevertheless, and preferably, the mass 230 is initiated by a mechanical striker or initiator.

Furthermore, in the context of the present invention, it is preferable to provide two initiators in parallel, both associated with the mass 230, so as to provide redundancy and reliability.

Thus, in the context of the present invention, the pyrotechnic actuator 200 preferably has two mechanical strikers 240, 245 associated with respective loading springs 241, 246 that are loaded in the rest position. Each striker 240, 245 is placed facing a cap 250, 255.

Initiation of either cap 250, 255 is transmitted in conventional manner to the pyrotechnic mass 230.

In the context of the invention, the pyrotechnic actuator 200 preferably includes a locking slide 260.

More precisely, the slide 260 performs two safety functions. Firstly, the slide 260 provides mechanical blocking of the piston 220 in the rest position. Secondly, in the rest position, the slide 260 provides mechanical blocking of the strikers 240 and 245.

The locking slide 260 may be embodied in a wide variety of ways. Preferably, it is mounted to move in translation in a direction orthogonal to the longitudinal axis 212 of the body 210. The slide 260 presents two segments having different right sections: an external segment 261 of large right section and an internal segment 262 of smaller right section. The body 210 presents a longitudinal groove 214 (see FIG. 6 in particular).

The groove 214 is of width that is smaller than the size of the right section of the external segment 261 of the slide 260, but greater than the same dimension for the right section of the internal segment 262.

In the rest position, as shown in FIGS. 8 and 10, the external segment 261 of the slide 260 is placed facing the groove 214. Thus, the slide 260 connected to the rod 220 cannot be moved in the groove 214. The slide 260 thus provides mechanical locking between the rod 220 and the body 210.

In contrast, the person skilled in the art will understand that when the slide 260 is urged radially outwards from the body 210 and the internal segment 262 comes into register with the longitudinal groove 214, then the slide can be moved in translation in the groove 214 and as a result the slide 260 will allow relative displacement between the rod 220 connected to the slide 260 and the body 210.

Furthermore, as can be seen in particular in FIG. 10, the slide 260 possesses firstly a structure 263 serving as an abutment to the strikers 240, 245 when the slide 260 is in its initial rest position as shown in FIG. 8. The slide 260 also possesses slots 264, 265 placed in register with the strikers 240, 245 after the slide 260 has been moved radially outwards in translation so as to allow the strikers 240, 245 to move against the caps 250, 255.

It should be observed that in the particular embodiment shown in the accompanying figures, the mass 230 of pyrotechnic material, the caps 250, 255, and the strikers 240, 245 are all carried by the rod 220. In a variant, all of these elements, or at least some of them, could be carried by the body 210.

In other variants of the invention, the pyrotechnic driver element 200 is associated with a damper element.

Figure 11:
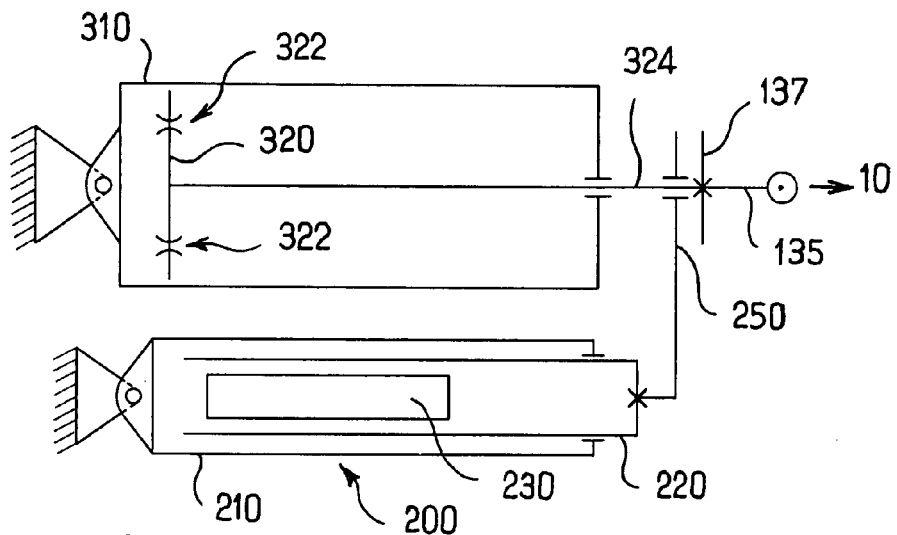
FIGS. 11, 12, and 13 are diagrams showing three various embodiments of a driver element in accordance with the present invention and associated with a damper element.

Accompanying FIG. 11 shows such a damper element diagrammatically under reference 300, which element is disposed in parallel with the pyrotechnic actuator 200. Such a damper element 300 may be embodied in a wide variety of ways. In the embodiment shown diagrammatically in FIG. 11, it may be an actuator possessing a body 310 and a piston 320 possessing calibrated bores 322 for allowing controlled displacement of fluid from one side of the piston 320 to the other when the rod 324 connected to the piston 320 is urged to move relative to the body 310.

Figure 12:
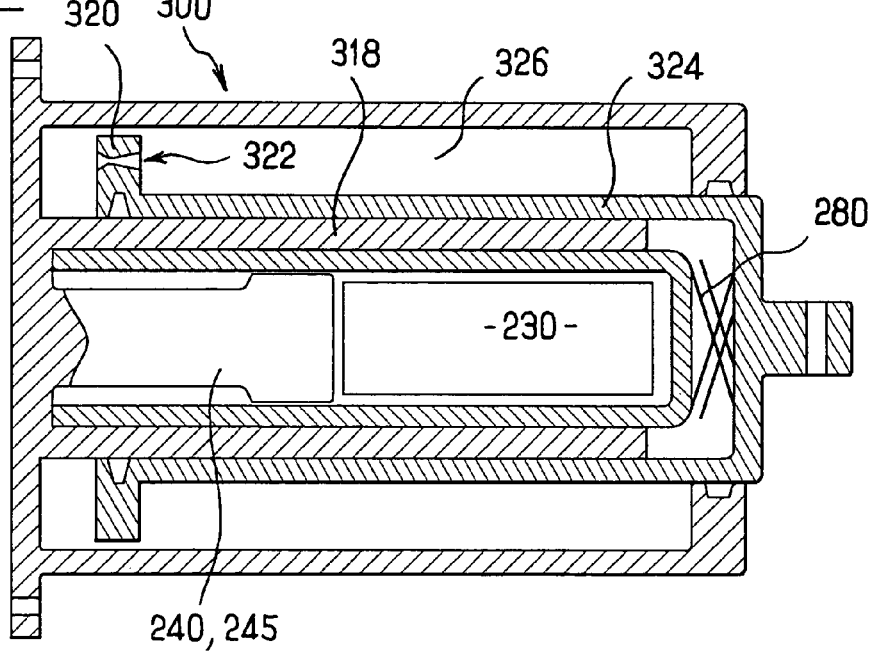

Accompanying FIG. 12 shows a variant embodiment in which the pyrotechnic actuator 200 is integrated in the rod 324 of such a damper element.

More precisely, in this variant, the rod 324 is in the form of a bell and co-operates with a skirt 318 centered on the body 310 so as to define an outer annular chamber 326 in which the piston 320 with the calibrated bores 322 moves.

The skirt 318 serves as the outer body of the pyrotechnic actuator.

The piston of the pyrotechnic actuator is also placed in the skirt 318. It houses the initiator system 240, 245 and the mass 230 of pyrotechnic material.

Preferably, a resilient damper means 280 is interposed between the pyrotechnic piston 220 and the piston or rod 324 of the damper.

Figure 13:
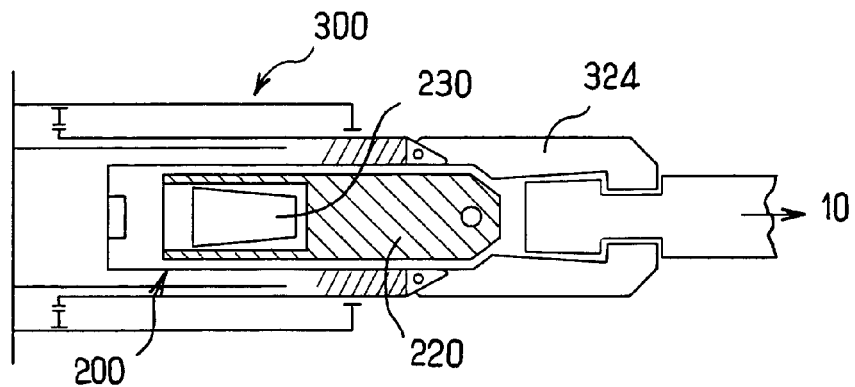

FIG. 13 shows a variant embodiment which differs from that of FIG. 12 by the fact that the rod- or piston-forming element 324 of the damper presents a line of weakness adapted to be broken when the pyrotechnic actuator 200 is operated in order to ensure that the damper element is declutched when the pyrotechnic actuator is put into operation. Under such circumstances, it will be understood that the force is exerted directly by the outlet piston or rod 220 of the pyrotechnic actuator.

The pyrotechnic actuator 200 may be controlled by any appropriate means. These means may be mechanical or electrical and based on the door fitted therewith so as to be available for use by the crew, or else they may be in the cockpit of the airplane.

The above-described describe operates essentially as follows.

During normal opening of the door, the door is moved manually, after traditional unlocking. Because of the relative sliding that is allowed between the rods 135, 145 and the thruster member 250, the driver element 200 has no effect in this context.

In contrast, as soon as the driver element 200 is put into operation, e.g. when an emergency requiring rapid opening is detected, once the locking element 260 has been withdrawn, the rod 220 actuates the thruster member 250 and, acting via the sets of chains 130, 140, it causes the arm 100 and the door to pivot.

The control assembly required for extracting the locking element 260 may be formed by any suitable means, for example a handle placed on the door and associated with appropriate connecting rodding.

When the driver element 200 constitutes a simple impulse thruster, as mentioned above, the closure element or door 10 continues to move under its own inertia when the abutments 137, 147 escape from the thruster member 250.

It should be observed that the present invention provides the advantage of making it easy for control to be localized on the door or to be remote therefrom. Furthermore, the use of a driver element of the pyrotechnic actuator type provides the advantage of good quality storage over time. It makes it possible to provide a system that is completely sealed. A pyrotechnic actuator does not require any vent, including for return to its original position, since the pyrotechnic actuator allows the rod 220 to be retracted easily once the gases that have been generated have cooled.

The present invention can withstand a wide range of temperatures. It makes it possible to provide a device that is lightweight and completely insensitive to variations of orientation in three dimensions, to electrical or electromagnetic interference, or indeed to any other type of attack, or to mechanical vibration.

Naturally, the present invention is not limited to the particular embodiments described above, but extends to any variant within its spirit.

In particular, in the context of the invention, it is possible to replace the above-described chain system by any other means suitable for keeping the door parallel with its original position, for example based on one or more deformable parallelograms, should that be required, or by any other connection-hinge means that provides the desired linkage, for example a simple pivoting or translation movement for use with a hatch.

The pyrotechnic actuator 200 is not necessarily disposed as described above. The actuator 200 could be located away from the arm. Furthermore, co-operation between the actuator 200 and the door 10 could be obtained using an interface other than a chain.

What is claimed is:

1. A device for controlling the movement of a vehicle closure element, the device comprising, interposed between a vehicle structure and a closure element, firstly a driver element that can be activated on command, constituted by a pyrotechnic actuator, and secondly mechanical connection means suitable for allowing a driving connection between the pyrotechnic actuator and the closure element when the pyrotechnic actuator is activated, while also allowing the closure element to move freely relative to the pyrotechnic actuator when the closure element is moved over a stroke greater than that enabling said driving connection, wherein the pyrotechnic actuator is an active impulse thruster having a stroke smaller than that of the closure element, so that after first displacement of the closure element following the driving operation of the pyrotechnic actuator acting as the active impulse thruster, the closure element continues to move under its own inertia over a stroke greater than that enabling said driving connection between the pyrotechnic actuator and the closure element.

2. A device according to claim 1, wherein the pyrotechnic actuator contains a mass of pyrotechnic composition possessing a section that varies and that is suitable for generating a force that is constant.

3. A device according to claim 1, including a mechanical safety slide which, in its rest position, prevents the pyrotechnic actuator from being operated.

4. A device according to claim 3, wherein the safety slide performs two locking functions: firstly locking the mechanical piston of the pyrotechnic actuator, and secondly mechanically blocking strikers.

5. A device according to claim 3, wherein the safety slide presents at least two segments, including an external segment placed at rest facing a groove formed in the body of the driver element and presenting a width that is smaller than the size in right section of said external segment.

6. A device according to claim 1, wherein the pyrotechnic actuator forms an impulse thruster.

7. A device according to claim 1, wherein the driver element possesses a pusher and the closure element is associated with at least one abutment placed facing the pusher so that the closure element is driven when the pusher presses against the at least one abutment, while allowing the at least one abutment to move freely away from the pusher.

8. A device according to claim 1, including a displacement amplifier between the pyrotechnic actuator and the closure element.

9. A device according to claim 8, wherein the displacement amplifier is constituted by a chain associated with a gearwheel.

10. A device according to claim 1, wherein the driver element is placed on an arm hinged to a vehicle structure and pivotally carrying the closure element.

11. A device according to claim 10, wherein the arm is V-shaped or L-shaped and carries two shafts, one of the shafts being connected to the structure of the vehicle, and being free to pivot relative to the arm, and the other shaft being connected to the closure element and being free to pivot relative to the arm.

12. A device according to claim 11, including rotary connection means between the two shafts.

13. A device according to claim 12, wherein the rotary connection means comprise at least one chain.

14. A device according to claim 13, having two sets of chains constituting parallel loops.

15. A device according to claim 13, wherein each set of chains comprises two chain segments interconnected by two rods that are guided to move in translation.

16. A device according to claim 1, wherein the driver element is interposed between a hinged arm and a chain.

17. A device according to claim 1, including means suitable for maintaining the closure element parallel relative to its original position, said means being placed on deformable parallelograms.

18. A device according to claim 1, wherein the closure element is constituted by an airplane door.

19. A device according to claim 1, further including a damper element.

20. A device according to claim 19, wherein the damper element is disposed in parallel with the driver element.

21. A device according to claim 19, wherein the damper element is integrated in the driver element.

22. A device according to claim 21, wherein the driver element is disposed in the rod of a damper piston and cylinder arrangement.

23. A device according to claim 19, wherein means are provided suitable for declutching the damper element in the event of the driver element being operated.

24. A device according to claim 23, wherein the rod of the damper piston and cylinder arrangement presents a line of weakness that is breakable in the event of the driver element being operated.

25. A device for controlling the movement of a vehicle closure element, the device comprising: interposed between a vehicle structure and a closure element,
firstly a driver element that can be activated on command, constituted by a pyrotechnic actuator, and
secondly mechanical connection means suitable for allowing a driving connection between the pyrotechnic actuator and the closure element when the pyrotechnic actuator is activated, while also allowing the closure element to move freely relative to the pyrotechnic actuator when the closure element is moved over a stroke greater than that enabling said driving connection,
wherein the driver element possesses a pusher and the closure element is associated with at least one abutment placed facing the pusher so that the closure element is driven when the pusher presses against the at least one abutment, while allowing the at least one abutment to move freely away from the pusher, and the pyrotechnic actuator is an active impulse thruster having a stroke smaller than that of the closure element, so that after first displacement of the closure element following the driving operation of the at least one abutment by the pusher of the pyrotechnic actuator acting as the active impulse thruster, the closure element continues to move under its own inertia over a stroke greater than that enabling said driving connection between the pusher of the pyrotechnic actuator and the at least one abutment of the closure element.

26. A device for controlling the movement of a vehicle closure element, the device comprising:
interposed between a vehicle structure and a closure element,
an arm hinged to a vehicle structure and pivotally carrying the closure element,
a first shaft and a second shaft, the first shaft and the second shaft are carried on said arm, the first shaft being connected to the structure of the vehicle, and being free to pivot relative of the arm, and the second shaft being connected to the closure element and being free to pivot relative to the arm,
rotary connection means in form of at least a loop, provided between the first shaft and the second shaft,
a driver element that can be activated on command, and which is provided on said arm, said driver element being constituted by a pyrotechnic actuator including a pusher, and
mechanical connection means comprising at least one abutment placed on said rotary connection means in form of at least a loop, facing the pusher for allowing a driving connection between the pyrotechnic actuator and the closure element when the pyrotechnic actuator is activated, while also allowing the closure element to move freely relative to the pyrotechnic actuator when the closure element is moved over a stroke greater than that enabling said driving connection, so that the closure element is driven when the pusher presses against the at least one abutment, while allowing the at least one abutment to move freely away from the pusher, and
wherein the pyrotechnic actuator is an active impulse thruster having a stroke smaller than that of the closure element, so that after first displacement of the closure element following the driving operation of the at least one abutment by the pusher of the pyrotechnic actuator acting as the active impulse thruster, the closure element continues to move under its own inertia over a stroke greater than that enabling said driving connection between the pusher of the pyrotechnic actuator and the at least one abutment of the closure element.

* * * * *